R. KUNISAWA.
SUNKEN VESSEL FLOATING APPARATUS OR SALVAGE APPARATUS.
APPLICATION FILED MAY 4, 1918.

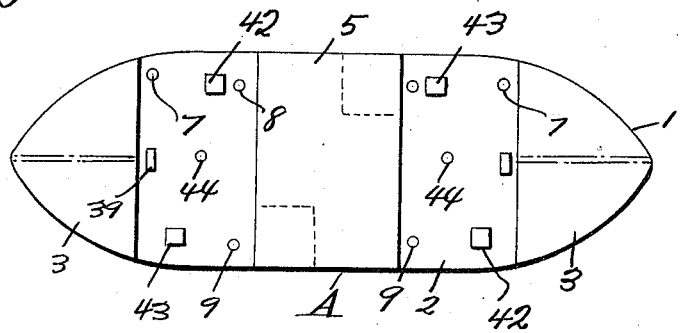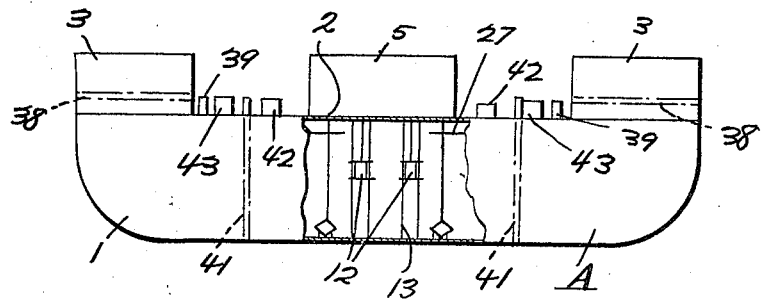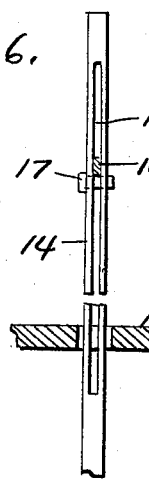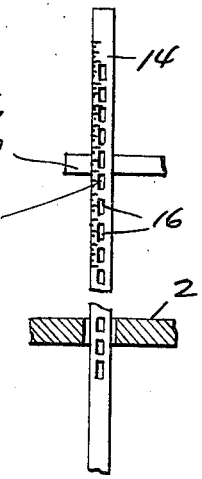

1,321,060.

Patented Nov. 4, 1919.
2 SHEETS—SHEET 2.

R. Kunisawa
Inventor

By Geo. P. Kimmel
Attorney

UNITED STATES PATENT OFFICE.

REKIZO KUNISAWA, OF TOKORO GUN, HOKKAIDO, JAPAN.

SUNKEN-VESSEL-FLOATING APPARATUS OR SALVAGE APPARATUS.

1,321,060.     Specification of Letters Patent.     Patented Nov. 4, 1919.

Application filed May 4, 1918. Serial No. 232,676.

*To all whom it may concern:*

Be it known that I, REKIZO KUNISAWA, a subject of the Emperor of Japan, and resident of Buke-Mura, Tokoro Gun, Hokkaido, the Empire of Japan, have invented a new and useful Sunken-Vessel-Floating Apparatus or Salvage Apparatus, of which the following is a specification.

The invention relates to a salvage apparatus, and more particularly to the class of sunken vessel flotation apparatuses.

The primary object of the invention is the provision of an apparatus of this character, the buoyant hull whereof has formed therein water inlets and air outlets, which are controlled through the medium of valves automatically operated to permit the said apparatus to submerge on the admission of water within the hull, the volume of water admitted within the latter being effective upon a float which coöperates with the mechanism controlling the valves so as to automatically actuate the same.

Another object of the invention is the provision of an apparatus of this character, wherein the same can be conveniently brought into use and will be effective in its purpose, without requiring excessive labor and expenditure in the operation thereof.

A further object of the invention is the provision of an apparatus of this character, which is comparatively simple in construction, novel in form, thoroughly reliable and efficient in its operation, and can be installed at a minimum expense.

The invention furthermore has for its object to improve apparatuses of the indicated character in varying particulars, to the end that efficiency in operation may be promoted, as well as simplicity in construction and convenience of adjustment and control.

The invention will be particularly explained in the specific description following:

Reference is to be had to the accompanying drawings forming a part of this specification, in which similar characters of reference indicate corresponding parts in all views.

In the accompanying drawings:
Figure 1 is a diagrammatic top plan view of the apparatus constructed in accordance with the invention.

Fig. 2 is a side elevation thereof showing the hull of the same broken away for a portion of the length thereof.

Fig. 5 is a fragmentary elevation of the float rod.

Fig. 6 is a view similar to Fig. 5 showing in detail the slot in the float rod.

Figure 3:
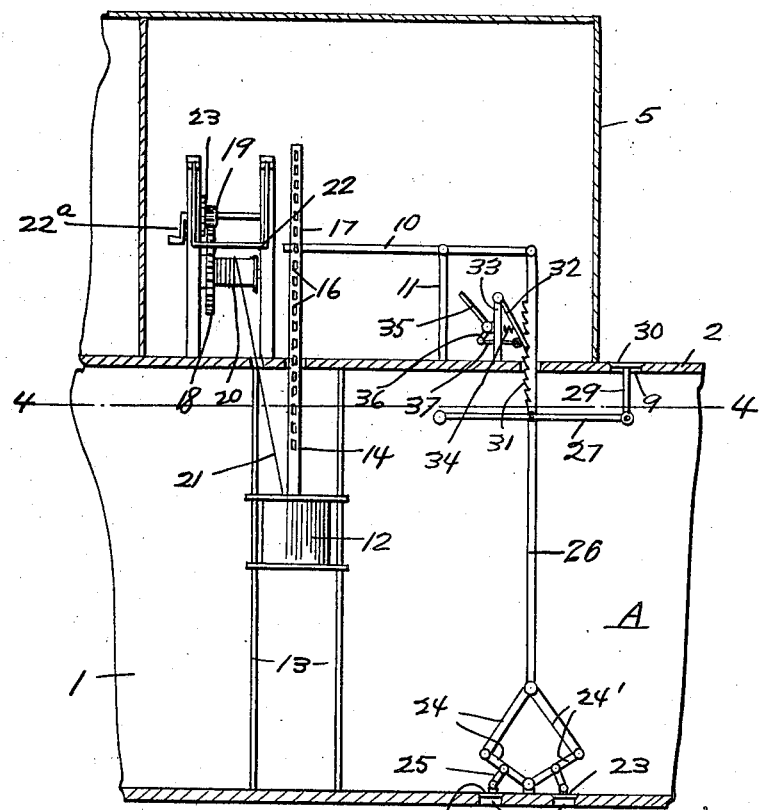
Fig. 3 is an enlarged fragmentary vertical longitudinal sectional view, showing the valves and the controlling mechanism therefor.
Figure 4:
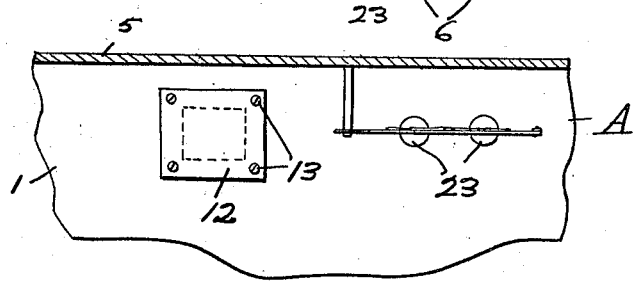
Fig. 4 is a fragmentary horizontal sectional view taken approximately on the line 4—4 of Fig. 3.

In constructing a practical embodiment of the invention in accordance with the illustrated example, the buoyant body A of the apparatus is in the form of a boat-like hull 1 having a deck 2 which tightly closes and seals the hull. Arranged fore and aft or at the bow and stern of the hull 1 upon the deck 2 are housings 3 constituting air chambers which assure buoyancy to the apparatus.

Medially of the hull 1 upon the deck 2 thereof is a cabin 5 having located therein valve controlling mechanism hereinafter fully described.

Formed in the bottom of the hull 1 are water inlets 6 and passed through the deck 2 are vertically disposed water discharge pipes 7, the deck being also formed with air inlets and outlets 8 and 9 respectively.

The valve controlling mechanism within the cabin 5 is arranged in duplicate and it is thought that a detailed description of one will suffice for the other. Each valve mechanism comprises a rocking beam or lever 10 pivoted intermediate its ends in a standard or upright 11 rising from and fixed in the deck 2. Located within the hull 1 is a water float 12 slidably supported upon guide bars 13 arranged in spaced parallel relation to each other and extending from the bottom of the hull 1 to the deck 2, the guide bars 13 being passed through the four corners of the float, which has attached centrally thereto a lifting rod 14 having a slot 15 longitudinally therein for a major portion of its length. The lifting rod 14 has thereon a suitable graduated scale and at intervals in this rod are transverse holes 16 which intersect the slot 15 for adjustably receiving a key or plug 17, which is detachably inserted in any one of the holes. The beam or lever 10 at the end thereof adjacent to the lifting rod 14 is freely passed through the slot 15 therein so that said beam or lever may move up or down and also the lifting rod 14 is free for vertical relative movement. The beam or lever 10 has its lower edge abutting and resting against the key or plug 17 in the lifting rod 14 as will be apparent from Figs. 5 and 6 of the drawings.

Upon the deck 2 adjacent to the lifting rod 14 is a stand or frame in which are rotatably supported gear wheels 18 and 19 respectively, the same being in meshing engagement with each other, the gear wheel 18 being fixed to a windlass 20 having connected thereto one end of a wire-rope or cable 21 which is adapted to be wound upon and from the said windlass, the other end of the rope or cable being connected in any suitable manner to the float 12.

On the stand or support for the gear wheels 18 and 19 is a suitable brake 22 for controlling the speed of rotation of the gear wheels 18 and 19, the gear wheel 19 being manually driven through the medium of a hand crank 22$^a$ connected with the axle of the said gear wheel. It will be obvious that the float 12 can be raised or lowered upon the guide bars 13 to any desired height relative to the bottom of the hull 1 by the winding of the rope or cable 21 upon the windlass or the unwinding of said rope or cable therefrom.

Normally closing the water inlet 6 are disk-like valves 23, which when in closed position render the water inlet 6 water tight. Pivoted to the bottom of the hull 1 between the valves 23 is a toggle including the levers 24 and 24' respectively, certain of which are connected with the valves 23 by the links 25 and connected to this toggle is a lifting rod 26 which extends upwardly through the deck 2 and is pivotally connected to the other end of the beam or lever 10. Pivoted to the lifting rod 26 beneath the deck 2 is a cross rod 27, one end of which is fulcrumed or pivoted in any suitable manner to the hull 1, while its opposite end has pivoted thereto the stem 29 of a disk-like valve 30 which normally closes the air outlet 9 in the deck 2, the lifting rod 26 being formed with rack teeth 31 with which engages a latch dog or detent 32 swingingly mounted upon a post 33 anchored in and rising from the deck 2 adjacent the lifting rod 26. Playing against the dog or detent 32 is an expansion spring 34 which forces the dog or detent into locking position. Pivoted to the post 33 is a hand operable lever 35 which is formed with an angular lower portion 36 to which is pivotally connected a link or connecting rod 37 the same being also pivotally connected to the dog or detent 32 and in this manner on operating the lever 35 the dog or detent can be unlatched from the lifting rod 26 as will be clearly obvious.

Suitably mounted upon the casings 3 and 4 are cable pipes 38 through which are adapted to be passed anchor cables, while upon the deck 2 are arranged cable windlasses 39 and in the side of the hull 1 are formed wire rope gullies 41, the deck 2 being also provided with wire rope windlasses 42 and 43 and a post 44 to which one end of a wire cable may be tied. The wire cables and ropes are to be provided to facilitate the connection of the apparatus with the side of a sunken vessel and also to anchor the said apparatus.

In the use of the apparatus each float 12 is adjusted the desired height from the bottom of the hull 1 by operating the gears 18 and 19 which causes the cable 21 to be wound on or from the windlass 20 and the positioning of this float 12 to be acted upon by the volume of water admitted into the hull 1. On the admission of water into the hull 1 to a predetermined level therein the float 12 becomes active for lifting the rod 14 which rocks the beam or lever 10 causing the rod 26 to become lowered and on movement of this rod the valves 23 and 30 are simultaneously operated for closing the water inlets 6 and the air outlets 9 thereby shutting out the admission of any further quantity of water into the hull 1 of the apparatus.

The key or plug 17 is properly inserted in any one of the holes 16 in the lifting rod 14 so as to hold the lever 10 in the proper position until a predetermined volume of water has been admitted into the hull whereupon the float 12 rises with the water causing the rocking of the beam or lever 10 and the lowering of the rod 26 for the simultaneous action of the valves 23 and 30 hereinbefore set forth.

To open the valves 23 and 30 the lifting rod 26 is raised. On the lowering of the lifting rod 26 the dog or detent 32 will lock the same against upward movement.

It is of course to be understood that suitable valve mechanism is arranged in the water outlet and the air inlet so that the water when once discharged cannot return and also the air admitted into the hull cannot escape through the air inlet to the atmosphere.

It is contemplated to provide suitable means for effectively closing the hull and the cabin 5 when the apparatus is shaken or tossed about by waves or other causes. Also suitable means is to be provided at each of the water inlets to prevent foreign matter working therethrough into the hull of the apparatus.

It is of course to be understood that any suitable appliance can be employed to facilitate the fastening of said apparatus to the side of a sunken vessel and also to prevent damage to either the apparatus or the sunken vessel by reason of contact and wear when the same are connected together.

It is of course understood that the apparatus is made in sets which are towed to the spot where the intended sunken vessel lies together with the operating ship. Then a survey is made of the water pressure at a given depth with the position of the sunken vessel, the direction of tide and other facts for the proper operation of the apparatus. After deciding the position of the apparatus the same is anchored by attaching anchors on all sides thereof. Thereafter the apparatus is connected with the sunken vessel after the said apparatus has become submerged in the body of water.

It is to be understood that a water discharge pipe and an air pipe are to be fitted to the water outlet 7 and the air inlet 8, these being connected with the operating ship. When the water admitted into the hull of the apparatus is discharged by a water pump, the sunken vessel will naturally rise to the surface of the water together with the floating apparatus to be carried to a place of safety.

In case it is difficult to operate in the usual manner on account of the sea being too deep, a floating apparatus is to be attached to the sunken vessel, and after the vessel is hauled up or raised to a convenient height, the said floating apparatus is operated in the usual manner.

From the foregoing it is thought that the construction and manner of operation of the apparatus will be clearly understood and therefore a more extended explanation has been omitted.

What is claimed is:

1. A sunken vessel floating apparatus or salvage apparatus of the class described, comprising an outer casing, a deck for closing said casing, a lever fitted to the deck, a lifting rod arranged at one end of said lever and connected with the lids of a water inlet and an air outlet provided in the hull in such a way that vertical movement of said lifting rod opens or closes said lids, a floating box arranged in the hull, a water volume regulator provided at the upper part of the floating box and connected with the remaining end of said lever through the deck in such a manner that said lever moves up or down freely, all of these parts being so arranged and constructed that the floating box is acted upon by the water volume so that when water admitted into the hull has reached a given height, one end of the lever is pushed up causing the lifting rod at the other end to descend to close the lids of the water inlet and the air outlet, and mechanism fitted to the lifting rod to prevent the rising of the lifting rod on its own accord and thereby hold the lids fast.

2. An apparatus of the character described comprising a hull having an air tight deck, the hull and deck being formed with openings, valves for closing said openings, a lever having connection with the valves for operating the same, means for locking the lever against movement in one direction, a float arranged within the hull, means extending from the float and having adjustable connection with the lever for rocking the same, and mechanism for raising and lowering the float within the hull and also for holding said float in its adjusted position.

3. An apparatus of the character described comprising a hull having an air tight deck, the hull and deck being formed with openings, valves for closing said openings, a lever having connection with the valves for operating the same, means for locking the lever against movement in one direction, a float arranged within the hull, means extending from the float and having adjustable connection with the lever for rocking the same, mechanism for raising and lowering the float within the hull and also for holding said float in its adjusted position, and buoyant elements arranged at opposite ends of the hull.

4. An apparatus of the character described comprising a hull having an air tight deck, the hull and deck being formed with openings, valves for closing said openings, a lever having connection with the valves for operating the same, means for locking the lever against movement in one direction, a float arranged within the hull, means extending from the float and having adjustable connection with the lever for rocking the same, mechanism for raising and lowering the float within the hull and also for holding said float in its adjusted position, buoyant elements arranged at opposite ends of the hull, and a water discharge pipe leading from the hull.

In witness whereof I affix my signature hereto.

REKIZO KUNISAWA. [L. S.]